United States Patent [19]

Cardoso et al.

[11] Patent Number: 4,594,896
[45] Date of Patent: Jun. 17, 1986

[54] METHOD OF AND DEVICE FOR SCANNING OBJECTS BY ULTRASOUND ECHOGRAPHY

[75] Inventors: Jean-François Cardoso, Paris; Mathias Fink, Strasbourg; François Hottier, La Varenne-Saint-Hilaire, all of France

[73] Assignee: U.S. Philips Corporation, New York, N.Y.

[21] Appl. No.: 659,798

[22] Filed: Oct. 11, 1984

[30] Foreign Application Priority Data

Oct. 28, 1983 [FR] France ................ 83 17282

[51] Int. Cl.⁴ .................................. G01N 29/00
[52] U.S. Cl. ............................. 73/599; 73/602; 73/620; 73/629
[58] Field of Search ............ 73/599, 602, 620, 629, 73/631

[56] References Cited

U.S. PATENT DOCUMENTS

| | | | |
|---|---|---|---|
| 4,445,379 | 5/1984 | Yamaguchi et al. | 73/631 |
| 4,470,303 | 9/1984 | O'Donnell | 73/602 |
| 4,472,972 | 9/1984 | Riley | 73/620 |

Primary Examiner—Howard A. Birmiel
Attorney, Agent, or Firm—Jack E. Haken

[57] ABSTRACT

A method for the scanning of non-linearly dispersive objects whereby changes of the energy spectrum of echographic signals can be quantitatively related to parameters of the objects examined, that is to say the ultrasonic attenuation factor $\beta$ and the exponent r which characterizes the relationship between the non-linear variation of the attenuation and the frequency. To this end, the signals received are split into a number of (n) substantially equally wide, consecutive frequency bands which together cover approximately all frequencies of the signals received. The envelope of the signals in each frequency band is determined and each of the envelopes is multiplied by a correction signal in order to compensate for the diffraction effect. The logarithm of the envelopes thus corrected is determined, after which the following operations are performed by means of the n signals thus obtained:

(a) the slope $\beta f_i^r$ of each of these n signals is determined;
(b) this signal $\beta f_i^r$ is converted into logarithmic form;
(c) in a table or a curve the relationship is laid down between the logarithmic value of the frequency for each channel log $f_i$ and the logarithmic value log $\beta f_i^r$ is generated; and
(d) the slope of the curve thus obtained and the value of log $\beta f^r$ for log f=0 are determined.

3 Claims, 2 Drawing Figures

METHOD OF AND DEVICE FOR SCANNING OBJECTS BY ULTRASOUND ECHOGRAPHY

The invention relates to a method of scanning objects by ultrasound echography, comprising the repeated transmission of ultrasonic signals and the reception of ultrasonic echos which correspond to the principal obstacles encountered by the transmitted signals in their propagation direction. The invention also relates to a device for performing such a method, comprising an ultrasonic transducer which is connected to a transmitter stage and a receiver stage. A device of this kind can be used, for example for non-destructive testing of materials or for the scanning of biological tissues.

During the passage of ultrasonic signals through objects such as biological tissues, the attenuation thereof in these objects varies in dependence of the frequency, so that changes occur in the energy spectrum of the echographic signal. The article "A closed form method for the measurement of attenuation in non-linearly dispersive media", Ultrasonic Imaging 5, 17–21 (1983) describes that these changes in non-linearly dispersive objects can be quantitatively related to the parameters which are characteristic of the object scanned, that is to say the ultrasonic attenuation factor $\beta$ and the exponent r (unequal to 1) which characterizes the relationship between the non-linear variation of the attenuation and the frequency. Unfortunately, experiments have demonstrated that this method of determining $\beta$ and r is not very accurate.

Therefore, it is the object of the invention to provide a method of and a device for scanning objects by ultrasound echography which allow the echographic signal to be quantitatively and significantly related to the parameters $\beta$ and r of the object scanned.

To this end, the method in accordance with the invention is characterized in that the signals received are split into a number (n) of approximately equally wide, consecutive frequency bands which together cover approximately all frequencies of the signals received. The envelope of the signals in each frequency band is determined. Each of the envelopes is multiplied by a correction signal in order to compensate for diffraction effects. The logarithm of the envelopes thus corrected is being determined. The following operations are then performed on the n signals thus obtained:

(a) the slope $\beta f_i^r$ for each of these n signals is determined;
(b) this signal $\beta f_i^r$ is converted into logarithmic form;
(c) a table or curve of the relationship between the logarithmic value of the frequency for each channel log $f_i$ and the logarithmic value log $\beta f_i^r$ determined in step b is generated; and
(d) the slope of the curve thus obtained and the value of log $\beta f^r$ for log f=0 is determined.

The device in accordance with the invention is characterized in that the receiver stage comprises at least:
(A) an amplifier which receives the output signal of the transducer;
(B) a group of n parallel connected channels connected to the output of the amplifier each channel in which successively comprises:
  (1) a band-pass filter, the pass-bands of the various filters being approximately equally wide and consecutive, so that together they cover approximately the pass-band of the transducer;
  (2) an envelope detector which is identical for each channel and which comprises a rectifier which is followed by a low-pass filter;
  (3) a multiplier circuit, a first input of which receives the output signal of the associated envelope detector and a second input thereof which receives a correction signal in order to compensate for the diffraction effect, said correction signal originating from a memory which is controlled by a clock circuit which itself is activated by the clock of the transmitter stage;
  (4) a logarithmic amplifier;
(C) an arithmetic circuit which is connected to the output of the n channels and which performs the following operations on the basis of the n output signals thereof;
  (a) determining the slope $\beta f_i^r$ of each of these n signals;
  (b) converting the signal $\beta f_i^r$ into logarithmic form;
  (c) generating a table or curve the relationship between the logarithmic value of the frequency for each channel log $f_i$ and the logarithmic value log $\beta f_i^r$ determined step (b);
  (d) determining the slope of the curve thus obtained and the value of log $\beta f^r$ for log f=0 and;
(D) means for storing the slope and the value of log $\beta f^r$ for log f=0 of said curve.

Using the described structure, signals can be processed in different frequency bands which are comparatively narrow with respect to the spectrum of the transducer and the results thus obtained can be compared in order to determine the parameters characterizing the object scanned.

The invention will be described in detail hereinafter, by way of example, with reference to the accompanying drawings. Therein:

Figure 1:
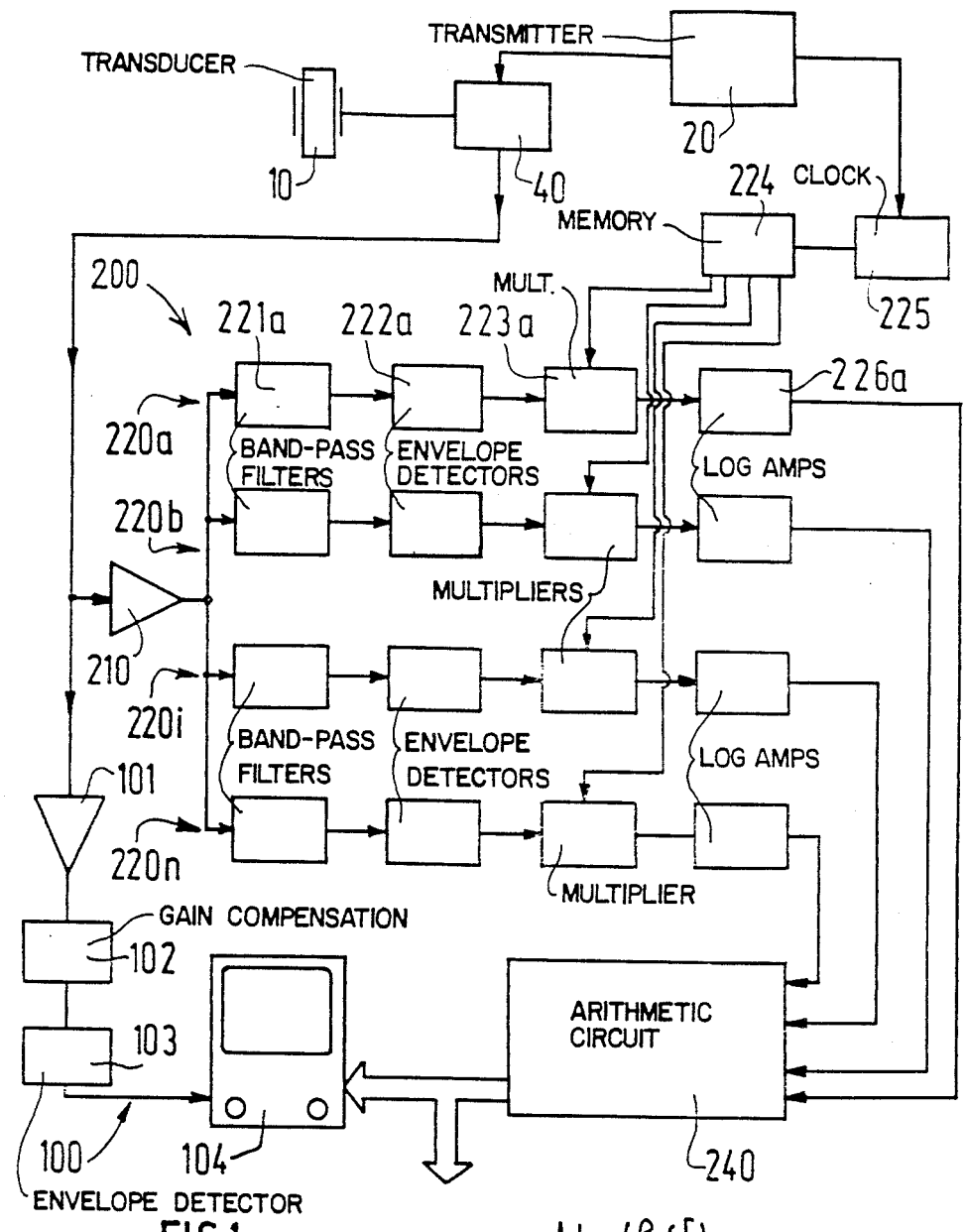
FIG. 1 shows an embodiment of the device in accordance with the invention.

The device described with reference to these Figures comprises a single probe which carries an ultrasonic transducer 10 and which serves to form A-type echograms of objects such as biological tissues. Evidently, the invention can be used in exactly the same way when, instead of a single line, a complete flat slice of the tissues is examined either by means of a manually displaceable probe, or a probe with mechanical sector scanning, which is connected to a radar-type display device or by means of a linear array of p ultrasonic transducers, or by means of an array of electronic sector scanning transducers.

The transducer 10 is connected on the one side to a transmitter stage 20 which is constructed so that the transducer can repeatedly transmit ultrasonic signals in an arbitrary scanning direction through the tissues to be examined, and on the other side to a receiver stage for the processing of the ultrasonic echos which are received by the transducer and which correspond to the principal obstacles encountered by the transmitted signals in their propagation direction. The situation of these obstacles is defined in the echograms by means of the echos of high amplitude which indicate the boundaries between the tissues for which the ultrasonic attenuation factors are to be determined. This connection is usually realized by means of a bidirectional selection circuit 40 which ensures that exclusively either the transmitter stage or the receiver stage is connected to the transducer (a selection circuit of this kind is disclosed, for example in U.S. Pat. No. 4,139,834). This selection circuit 40 ensures that the transmitted signals are not affected by the reception signals and that the signals received are not masked by the signals transmitted.

The receiver stage of the described embodiment comprises on the one side a first processing circuit 100 for the processing of the ultrasonic echos received, said circuit being composed of a first amplifier 101 (which is actually a preamplifier), a gain compensation device 102, an envelope detector 103 for rectifying and filtering, and a display device 104. The output electrode of the transducer 10 is connected, via the circuit 40, to the input of the amplifier 101, the output signals of which are fed via the gain compensation device 102 which compensates the amplitude of the echos in dependence of the distance, and also via the device 103, after which these signals are displayed on the display device 104 in the form of an A-type echogram along an axis which corresponds to the principal propagation direction of the transducer 10. The receiver stage comprises on the other side a second processing circuit which is connected parallel to the first processing circuit 100 and which is composed of the following elements:

(A) a second amplifier 210 which also receives the output signal of the transducer 10;

(B) a group of n parallel connected channels 220a ... 220n at the output of the amplifier 210, each of which successively comprises:

(1) a band-pass filter 221a ... 221n, the pass-bands of the various filters being substantially equally wide and consecutive so that together they cover approximately the pass-band of the transducer;

(2) an envelope detector 222a ... 222n which is identical for each channel and which comprises a rectifier which is followed by a low-pass filter having a variable time constant whose value preferably exceeds the mean time interval between the echos of low amplitude which correspond to two successive dispersion points in order to reduce the noise which is inherent of the biological object and the inhomogeneities thereof;

(3) a multiplier circuit 223a ... 223n, a first input of which receives the output signal of the associated envelope detector, while a second input thereof receives a correction signal in order to compensate for the diffraction effects, said correction signal originating from a memory 224 which is controlled by a clock circuit 225 which itself is activated by the clock of the transmitter stage 20;

(4) a logarithmic amplified 226a ... 226n;

(C) an arithmetic circuit 240 which is connected to the output of the n channels 220a ... 220n and which performs the following operations on the basis of the n output signals thereof;

(a) determining the slope $\beta f_i^r$ of each of these n signals;

(b) converting this signal $\beta f_i^r$ into logarithmic form;

(c) generating a table or a curve the relationship between the logarithmic value of the frequency for each channel log $f_i$ and the logarithmic value log $\beta f_i^r$ determined in paragraph (b) above; where the slope of the curve thus obtained and the value of log $\beta f_i^r$ for log f=0 are the parameters characterizing the object scanned.

Figure 2:
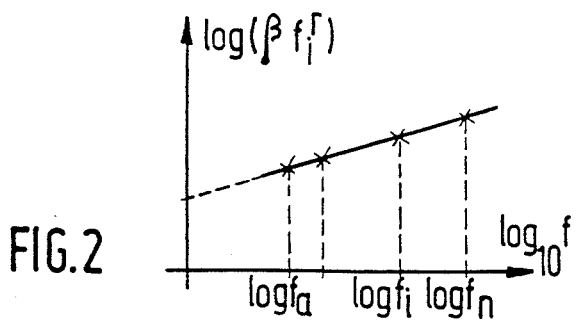
FIG. 2 shows the results of the operations performed by the processing circuit which forms part of the device in accordance with the invention.

The output signal of each of the channels, for example the $i^{th}$ channel, is proportional to $\beta f_i^r t$, in which $f_i$ is the most representative frequency for the relevant channel i, and r is the exponent (unequal to 1) expressing the non-linear dependency of the attenuation as a function of the frequency. The arithmetic circuit 240 determines the slope $\beta f_i^r$ of each of these output signals, subsequently converts these expressions into logarithmic form log $\beta$ + r log $f_i$, and either forms a table of the n values of this logarithmic expression log ($\beta f_i^r$) as a function of the logarithm of the frequency $f_i$ or describes in an equivalent manner a curve which comprises n points and which is actually a straight line whose ordinate for log f=0 is log $\beta$ and whose slope is the exponent r (see this curve in FIG. 2). These two data, forming the two desired parameters, are either displayed directly for the user via a display screen (of the display device 104) or a printer, or are stored in a memory for interpretation or use at a later stage.

It will be apparent that the invention is not restricted to the described embodiment, for which alternatives are feasible without departing from the scope of the invention. Notably a part of the receiving stage, that is to say the part following the amplifier 210, can be replaced by a series connection of the following elements; an analog-to-digital converter, a fast calculating circuit for the calculation of Fourier transforms for the scanning of the frequency band as previously performed via the n channels, and an arithmetic circuit which is comparable to the circuit 240 but which also performs the diffraction corrections, said elements being controlled by a microprocessor.

The memory is either a programmable read-only memory (PROM) or a random access memory (RAM); it is loaded as follows when the transducer is of the focussing type. A part of an object to be examined is selected which is situated at the front of the object with respect to the device, at a distance Z on the principal axis of propagation, the intermediate medium between this part and the device being a medium having a low attenuation, for example water. Subsequently, first the energy spectrum of the echographic signal is determined in this position and after that at the same distance Z but in other positions which are reached by displacements perpendicularly to the principal axis of propagation in order to obtain a mean energy spectrum (for example, a mean value of 100 spectrums around the same position is determined). Subsequently, the mean energy spectrum is determined again in the same manner, but with other distances Z between the device and the object to be examined; however, thanks to the effect of a time selection circuit which defines a time window, the examination remains aimed at the same part of the object. Subsequently, for all these successive positions along the Z-axis there are calculated the correction values for the diffraction effect, because the measurements performed have eliminated any effect of the attenuation because of the suitable choice of the intermediate medium; these correction values are stored in the memory 224.

In the case of a non-focussing transducer, the determination of the correction values does not necessitate the use of a part of the object to be examined; instead, use is simple made of a (for example, flat or spherical) reflective surface of a reference body.

Finally, it is to be noted that the amplifier 210 in the described embodiment is a fixed-gain amplifier; however, should this element be replaced by a circuit with automatic gain control as a function of the distance, it would be necessary to keep this gain temporarily constant for the execution of the measurements. This a result can be obtained by means of a time window which temporarily inhibits the variation of the gain between two instants which correspond to the part of the tissue whereto the measurements relate.

We claim:

1. A method for scanning objects by ultrasound echography comprising the steps of:

repeatedly transmitting ultrasonic signals into the objects and receiving therefrom ultrasonic echoes which correspond to the principal obstacles encountered by the transmitted signals in their propagation direction;

generating echo signals which correspond to the received echoes and splitting said echo signals into a plurality of approximately equally-wide, consecutive frequency bands which together substantially cover all frequencies in said echo signals;

detecting the envelope of the echo signals in each frequency band;

multiplying each of the detected envelopes by correction signals which compensate them for diffraction effects to produce corrected envelope signals;

determining logarithm signals from each of said corrected envelope signals;

calculating a slope signal $\beta f_i^r$ for each of said logarithm signals;

calculating the logarithm of the slope signals $\beta f_i^r$;

generating a table or curve which describes the relationship between the value log $f_i$ of the most representative frequency $f_i$ in each channel and the logarithm of the slope signal log $\beta f_i^r$ which was determined in the previous step; and determining the slope of the relationship described by said table or curve and the value of the ordinate of the intercept of said curve at log f=0.

2. The method of claim 1 further comprising the steps of determining the correction signals for compensation for diffraction effects by:

selecting a part of an object to be examined which part is situated at the front of the object with respect to the source of transmitted signals and at a distance Z therefrom along the principal axis of propagation, wherein the propagation medium between the source of the transmitted signals and the selected part of the object has a low attenuation;

determining the energy spectrum of the echoes reflected from said part of the object;

displacing the source perpendicular to said principal axis and repeating the measurement of the energy spectrum of the echographic signal;

calculating a mean of said energy spectra;

displacing the source to other distances from the selected part of the object and repeating the previous two steps to obtain further mean energy spectra from the same selected part of the object; and calculating the correction signals for said successive positions along the axis.

3. A device for scanning of objects by ultrasound echography comprising;

a least one ultrasonic transducer;

transmitter means for causing the repeated transmission of ultrasonic signals from the transducer(s) into the objects;

receiver means for receiving signals corresponding to ultrasonic echoes from principal obstacles encountered by the transmitted signals in their propagation direction from the transducer, said receiver means including:

(A) an amplifier which receives the output signal of the transducer;

(B) a plurality of parallel connected channels connected to the output of the amplifier, each channel successively comprising:

(1) a bandpass filter, the pass-band of all of the filters being approximately equally wide and consecutive so that together they substantially cover the pass-band of the transducer(s);

(2) envelope detector which is connected to the output of the bandpass filter and which includes a rectifier and a low pass filter;

(3) multiplier means connected to receive the output of the associated envelope detector means and to multiply it by a second input which corresponds to a correction factor for diffraction effects;

(4) a logarithmic amplifier connected to the output of the multiplier means; and (C) arithmetic means connected to the outputs of all of the logarithmic amplifiers for performing the following operations on the output signals thereof:

(a) calculating the slope $\beta f_i^r$ for each of the signals;

(b) converting each of the slope signals $\beta f_i^r$ into logarithmic form, log $\beta f_i^r$;

(c) generating in table or curve form the relationship between the logarithmic value of the most representative frequency in each channel log $f_i$ and the logarithmic value log $\beta f_i^r$ determined in the previous subparagraph (b);

(d) determining the slope of the curve thus obtained and the value of the intercept of the function log $\beta f^r$ with the f=0 axis.

* * * * *

UNITED STATES PATENT AND TRADEMARK OFFICE
CERTIFICATE OF CORRECTION

PATENT NO. : 4,594,896

DATED : June 17, 1986

INVENTOR(S) : JEAN-FRANCOIS CARDOSO ET AL

It is certified that error appears in the above-identified patent and that said Letters Patent is hereby corrected as shown below:

In the Claims:

Column 6, line 31, insert --means-- after "detector".

Signed and Sealed this

Sixteenth Day of September 1986

[SEAL]

Attest:

DONALD J. QUIGG

Attesting Officer     Commissioner of Patents and Trademarks